United States Patent
Wu et al.

(10) Patent No.: US 9,276,866 B2
(45) Date of Patent: Mar. 1, 2016

(54) TUNING CONGESTION NOTIFICATION FOR DATA CENTER NETWORKS

(71) Applicant: Microsoft Corporation, Redmond, WA (US)

(72) Inventors: Haitao Wu, Beijing (CN); Guohan Lv, Seattle, WA (US); Chuanxiong Guo, Jiangsu (CN); Yongqiang Xiong, Beijing (CN); Yongguang Zhang, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 98 days.

(21) Appl. No.: 13/690,345

(22) Filed: Nov. 30, 2012

(65) Prior Publication Data
US 2014/0153387 A1  Jun. 5, 2014

(51) Int. Cl.
*H04L 12/26* (2006.01)
*H04L 12/805* (2013.01)
*H04L 12/835* (2013.01)

(52) U.S. Cl.
CPC .............. *H04L 47/36* (2013.01); *H04L 47/30* (2013.01)

(58) Field of Classification Search
CPC ..... H04L 47/27; H04L 47/225; H04L 43/103; H04L 43/0894; H04L 47/60; H04L 47/6215; H04L 47/2441; H04L 47/12; H04L 47/10; H04L 47/11; H04L 47/30; H04L 47/32; H04L 47/26; H04L 47/29; H04L 47/31; H04L 47/33; H04L 47/283; H04L 47/326; H04L 47/2466; H04L 47/263; H04L 47/35; H04L 47/115; H04W 28/0231; H04W 28/08; H04W 28/14; H04W 28/06
USPC ......... 370/230, 234, 235, 389, 412, 229, 236, 370/230.1, 232, 252, 231, 237, 238; 709/217, 232, 235; 710/52
See application file for complete search history.

(56) References Cited

U.S. PATENT DOCUMENTS

| 6,741,555 | B1 | 5/2004 | Li et al. | |
|---|---|---|---|---|
| 7,369,498 | B1 | 5/2008 | Ma et al. | |
| 2005/0226150 | A1 * | 10/2005 | Santos et al. | 370/230 |
| 2006/0034286 | A1 * | 2/2006 | Koning et al. | 370/394 |

(Continued)

OTHER PUBLICATIONS

Lakshman et al, "The Performance of TCP/IP for Networks with High Bandwidth-Delay Products and Random Loss", IEEE and ACM Transactions on Networking, vol. 5, No. 3, Jun. 1997, 15 pgs.

(Continued)

*Primary Examiner* — Marcus R Smith
*Assistant Examiner* — Rose Clark
(74) *Attorney, Agent, or Firm* — Sandy Swain; Micky Minhas; Lee & Hayes, PLLC (57) ABSTRACT

A system, method or computer readable medium to provide efficient congestion notification is described herein. In various embodiments, a packet is received at an intermediate node of one or more data center networks. A current queue length at the intermediate node is determined. A threshold value for the current queue length is tuned by dynamically computing an upper bound and a lower bound based at least in part on the network. The packet is marked to indicate possible congestion in the one or more data center networks when the current queue length exceeds the threshold value. In some embodiments, the packet is marked when it is being de-queued. In a further embodiment, Flexible Initial Packet Size (FIPS) may be utilized to improve the efficiency of the tuning.

17 Claims, 5 Drawing Sheets

(56) References Cited

U.S. PATENT DOCUMENTS

| | | | |
|---|---|---|---|
| 2006/0092836 A1* | 5/2006 | Kwan et al. | 370/229 |
| 2006/0092837 A1* | 5/2006 | Kwan et al. | 370/229 |
| 2006/0098681 A1* | 5/2006 | Cafiero et al. | 370/445 |
| 2008/0037420 A1* | 2/2008 | Tang | 370/229 |
| 2008/0253301 A1* | 10/2008 | Keromytis et al. | 370/252 |
| 2011/0032935 A1* | 2/2011 | Yang | 370/389 |
| 2011/0211449 A1 | 9/2011 | Attar et al. | |
| 2012/0120801 A1* | 5/2012 | Ramakrishnan et al. | 370/235 |
| 2012/0195201 A1* | 8/2012 | Ishikawa | 370/235.1 |
| 2013/0201927 A1* | 8/2013 | Masputra et al. | 370/329 |
| 2013/0343187 A1* | 12/2013 | Wang et al. | 370/230 |
| 2014/0022956 A1* | 1/2014 | Ramalho et al. | 370/260 |
| 2014/0064079 A1* | 3/2014 | Kwan et al. | 370/234 |
| 2014/0105019 A1* | 4/2014 | Harrang et al. | 370/235 |
| 2014/0140212 A1* | 5/2014 | Morandin | 370/235 |

OTHER PUBLICATIONS

Lakshman et al, "The Drop from Front Strategy in TCP and in TCP over ATM", INFOCOM, Proc 15th annual joint conf of IEEE computer and communications societies, Mar. 1996, 9 pgs.

Zhang, et al.,"On Mitigating TCP Incast in Data Center Networks", In Proceedings of IEEE INFOCOM, Apr. 10, 2011, 5 pages.

Shpiner, et al., "A Switch-Based Approach to Throughput Collapse and Starvation in Data Centers", In Proceedings of 18th International Workshop on Quality of Service, Jun. 16, 2010, 9 pages.

Alizadeh, et al., "Less is More: Trading a Little Bandwidth for Ultra-Low Latency in the Data Center", Proc 9th ACM USENIX Symposium on Networked Systems Design and Implementation, Apr. 26, 2012, 14 pgs.

Peng, et al.,"A Proposal to Apply ECN to Wireless and Mobile Networks", In Proceedings of INET, Jun. 18, 2000, 11 pages.

Ahmed, et al., "Enhancing TCP Performance in Mobile Ad Hoc Networks", In Proceedings of National Conference on Emerging Technologies, Dec. 18, 2004, 6 pages.

Al-Fares, et al., "A Scalable, Commodity Data Center Network Architecture", In Annual Conference of the Special Interest Group on Data Communications, Aug. 17, 2008, 12 pages.

Alizadeh, et al., "DCTCP: Efficient Packet Transport for the Commoditized Data Center", In Annual Conference of the ACM Special Interest Group on Data Communication, Jan. 2010, 15 pages.

Alizadeh, et al.,"Analysis of DCTCP: Stability, Convergence, and Fairness", In Proceedings of in ACM SIGMETRICS Joint International Conference on Measurement and Modeling of Computer Systems, Jun. 7, 2011, 14 pages.

Appenzeller, et al.,"Sizing Router Buffers", In Proceedings of the Conference on Applications, Technologies, Architectures, and Protocols for Computer Communications, Aug. 30, 2004, 15 pages.

Dean, et al., , "MapReduce: Simplified Data Processing on Large Clusters", In Proceedings of 6th Symposium on Operating Systems Design and Implementation, Dec. 2004, 13 pages.

Floyd, et al., "Adaptive RED: An Algorithm for Increasing the Robustness of RED's Active Queue Management", Published on: Aug. 2001, Available at: http://www.icir.org/floyd/papers/adaptiveRed.pdf, 12 pgs.

Floyd, et al., "Random Early Detection Gateways for Congestion Avoidance", In Proceedings of in IEEE/ACM Transactions on Networking, vol. 1, Issue 4, Aug. 1993, 17 pages.

Ghemawat, et al., "The Google File System", In Proceedings of the Nineteenth ACM Symposium on Operating Systems Principles, Oct. 19, 2003, 15 pages.

Guo, et al., "BCube: A High Performance, Server-centric Network Architecture for Modular Data Centers", In Proceedings of the ACM SIGCOMM Conference on Data Communication, Aug. 17, 2009, 12 pages.

Guo, et al., "DCell: A Scalable and Fault Tolerant Network Structure for Data Centers for Data Centers", In Proceedings of the ACM SIGCOMM Conference on Data communication, Aug. 17, 2008, 12 pages.

Kandula, et al., "The Nature of Datacenter Traffic: Measurements & Analysis", In Proceedings of the 9th ACM SIGCOMM Conference on Internet Measurement Conference, Nov. 4, 2009, 7 pages.

Kuzmanovic, et al., "The Power of Explicit Congestion Notification", In Proceedings of the Conference on Applications, Technologies, Architectures, and Protocols for Computer Communications, Aug. 21, 2005, 12 pages.

Mellia, et al., "TCP Smart Framing: A Segmentation Algorithm to Reduce TCP Latency", In Proceedings of in IEEE/ACM Transactions on Networking, vol. 13, Issue 2, Apr. 2005, 14 pages.

Nagle, et al., "The Panasas ActiveScale Storage Cluster: Delivering Scalable High Bandwidth Storage", In Proceedings of the ACM/IEEE SC Conference on Supercomputing, Nov. 6, 2004, 10 pages.

Phanishayee, et al., "Measurement and Analysis of TCP Throughput Collapse in Cluster-based Storage Systems", In Proceedings of the 6th USENIX Conference on File and Storage Technologies Article No. 12, Feb. 2008, 14 pages.

Ramakrishnan, et al., "The Addition of Explicit Congestion Notification (ECN) to IP", In RFC The Addition of Explicit Congestion Notification (ECN) to IP, Sep. 2001, 63 pages.

Ramakrishnan, et al., "A Binary Feedback Scheme for Congestion Avoidance in Computer Networks. Digital Equipment", In ACM Transactions on Computer Systems, vol. 8, Issue 2, May 1990, 24 pages.

Vasudevan, et al., "Safe and Effective Fine-grained TCP Retransmissions for Datacenter Communication", In Proceedings of the ACM SIGCOMM Conference on Data Communication, Aug. 17, 2009, 12 pages.

Wu, et al.,"ICTCP: Incast Congestion Control for TCP in Data Center Networks", In Proceedings of the 6th International Conference Article No. 13, Nov. 30, 2010, 12 pages.

\* cited by examiner

TUNING CONGESTION NOTIFICATION FOR DATA CENTER NETWORKS

BACKGROUND

Data center networks are designed to support various applications and diverse traffic patterns. Advanced topologies and structures achieve higher bandwidth in data center networks. However, long completion time of short transmission control protocol (TCP) flows in competition with long TCP flows and the congestion due to TCP incast are a few of the concerns about the TCP performance in data centers.

For example, TCP incast congestion is an issue in data center networks. TCP incast occurs when many-to-one short flows are barrier synchronized. Extremely high bandwidth and low latency may be preconditions for incast congestion. Previous solutions are inefficient by requiring complicated modifications to the data center networks.

SUMMARY

Described herein are techniques for improving TCP performance. In various embodiments, computing devices may be configured with a congestion detection module configured to determine a current queue length at an intermediate node of one or more data center networks. The computing device may also be configured with a threshold module configured to set a threshold value for the current queue length by determining an upper bound and a lower bound, and a congestion notification module configured to mark a packet to indicate possible congestion in the one or more data center networks when the current queue length exceeds the threshold value.

In various embodiments, these computing devices may also include a de-queue marking module associated with the congestion notification module configured to check the current queue length and the threshold value when the packet is being de-queued, and mark the packet when the current queue length is larger or equal to the threshold value when the packet is being de-queued. Moreover, these computing devices may also include a flexible initial packet size (FIPS) module configured to probe the network with a plurality of small packets having a smaller payload size than the standard packets sent with standard payload size.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Overview

This disclosure describes, in part, techniques for improving TCP performance. In various embodiments, the performance is improved by the use of instant or current queue length and determining, using the characteristics of the network parameters, a threshold value using upper and lower bounds to tune the congestion notification at an intermediate node. In various embodiments, marking of the congestion information on the packet occurs when the packet is being de-queued instead of when it is received at the output queue. In a further embodiment, a flexible initial packet size (FIPS) scheme may be utilized to improve the efficiency of the tuning.

Figure 1:
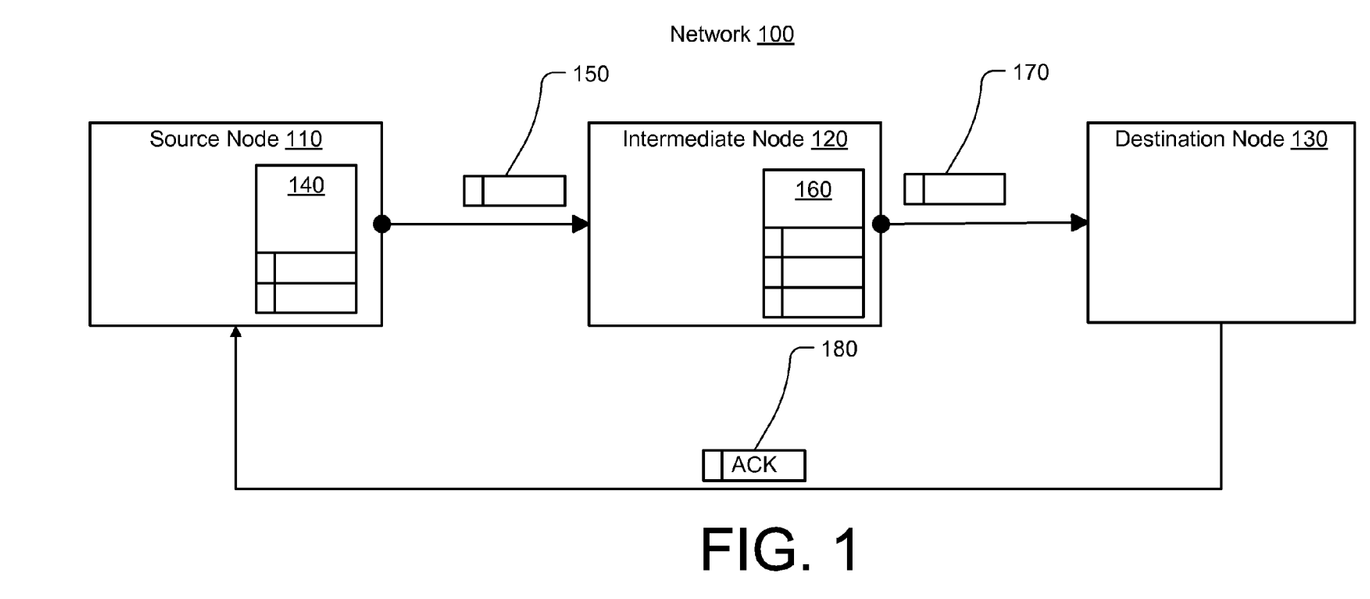
FIG. 1 illustrates an overview of example network, in accordance with various embodiments.

FIG. 1 shows an overview of example network 100, in accordance with various embodiments. As illustrated in FIG. 1, the network 100 may include a source node 110, an intermediate node 120 and a destination node 130 for transmission of packets. Additional intermediate nodes may be included along the path of the transmission of the packets.

In some embodiments, a source node 110 may include a source output queue 140 having a congestion window. The congestion window having a size that may be adjusted in response to indications received from the network. A packet 150 from the source output queue 140 may be transmitted via an output port of the source node 110 to the intermediate node 120. The packet 150 may include a header portion and a payload portion. The length of the payload of the packets may vary as desired.

In some embodiments, the intermediate node 120 may receive the packet 150 and store it in the intermediate output queue 160. In an embodiment, the packet 150 may be stored and de-queued in a first-in-first-out (FIFO) manner. In other embodiments, the packets may be stored and de-queued based at least in part on a priority indicated by the packet. Any ordering strategy may be used. In various embodiments, the packet 150 may be marked by asserting a bit in the header based at least in part on congestion experienced. This bit may be used as a congestion notification. The congestion notification bit may be set according to an amount of stored packets in the intermediate output queue 160 at the time of the de-queuing. The amount may be determined by comparing a calculated threshold value using information collected about the network 100 and a current queue length of the intermediate output queue 160 at the time of de-queuing. Then, an output packet 170, which may or may not be marked, may be transmitted to the destination node 130.

In various embodiments, whether or not to mark the packet 150 is based at least in part on the current queue length and any threshold value such as the calculated threshold value described above. For example, the packet 150 may be marked when the current queue length exceeds or is equal to the threshold value. The threshold value may be determined by a lower bound and an upper bound. The lower bound may be the threshold value at which the TCP throughput performance will not be affected after a congestion window reduction at the source node 110. For example, the lower bound may be determined by the Bandwidth Delay Product (BDP). The upper bound may be the threshold value at which packet loss is expected to begin at the output queue 160 of the intermediate node 120. That is, when the queue length is lower than the upper bound, no packets are lost due to buffer overflow.

In some embodiments, the packet 150 is marked when the packet 150 is about to be de-queued and transmitted as the output packet 170 to one or more other intermediate nodes or the destination node 130. Congestion notification with de-queue marking accelerates the congestion information delivery to an end system because setting the marks when packets are queued delays the delivery of congestion information since each packet has to wait its turn.

In various embodiments, the destination node 130 receives the packet 170 and responds to the source node with an acknowledgement packet (ACK) 180 by echoing the congestion notification information in packet 170 to the source node 110 by asserting a bit in the ACK 180 when the packet 170 is marked. In some embodiments, echoing is performed for every packet while in other embodiments echoing may be suppressed by the source node. In response to receiving the ACK 180 at the source node 110, the source node 110 may decides whether or not to adjust a size of the congestion window of the source node 110 based at least in part on the ACK 180 from the destination node 130. In some embodiments, the congestion window size of the source node 110 may be cut in half in response to the ACK 180. In other embodiments, the congestion window size may be reduced by a ratio of marked to unmarked ACK's. Using the ratio, the congestion window size may be changed by multiple levels. Any other desired reduction method may be used to adjust the congestion window size.

In various embodiments, the source node 110 and destination node 130 function as in the explicit congestion notification (ECN) protocol. ECN implementation at the intermediate nodes may be modified by utilizing the upper and lower bounds to tune the ECN at the intermediate nodes only. If the threshold is properly tuned, the modified ECN may alleviate the TCP performance impacts without requiring end host modifications such that the standard ECN congestion control may be used at the end hosts.

Example Electronic Device

Figure 2:
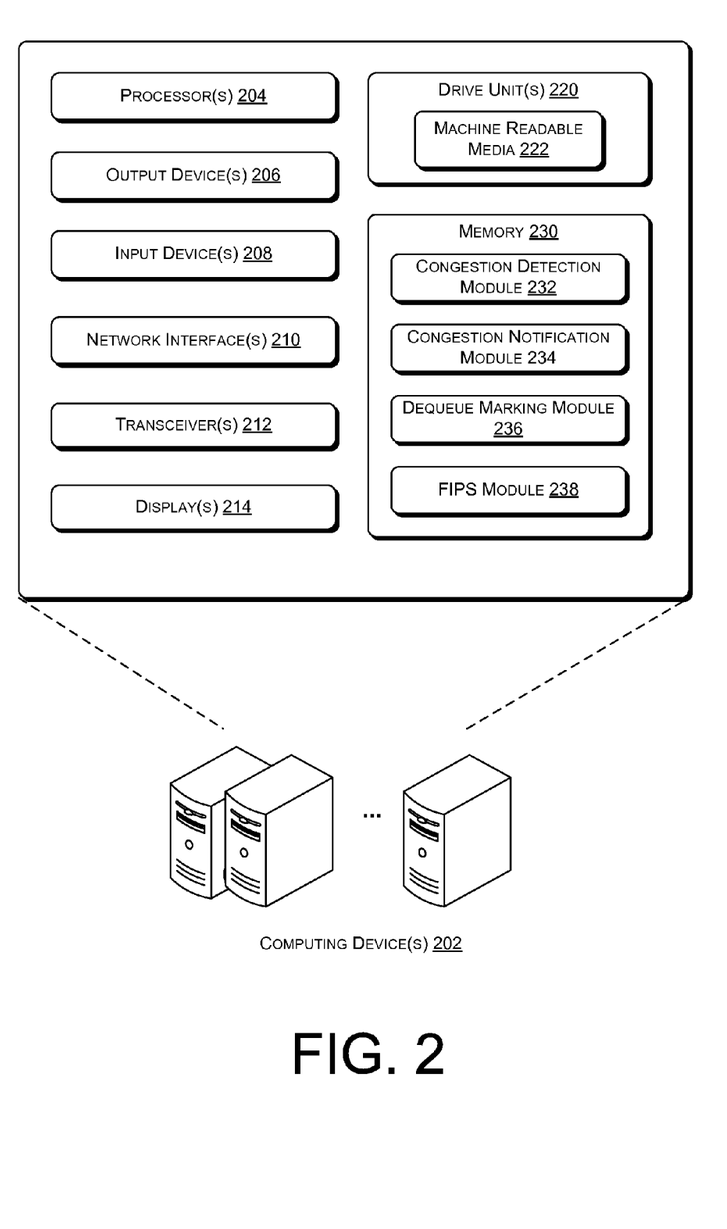
FIG. 2 illustrates example computing devices, in accordance with various embodiments.

FIG. 2 illustrates an example computing device configured with functionality for performing various embodiments of congestion notification. As illustrated, one or more computing device(s) 202 (referred to as "computing device 202") may include processor(s) 204, output device(s) 206, input device(s) 208, network interface(s) 210, transceiver(s) 212, display(s) 214, drive unit(s) 220, and memory 230. The drive unit(s) 220 may include one or more machine readable media 222. The memory 230 may include a congestion detection module 232, a congestion notification module 234, a de-queue marking module 236 and a FIPS module 238.

In various embodiments, the computing device(s) 202 may be any sort of computing device or computing devices. For example, the computing device(s) 202 may be or include a personal computer (PC), a laptop computer, a server or server farm, a mainframe, a tablet computer, a work station, a telecommunication device, a personal digital assistant (PDA), a media player, a media center device, a personal video recorder (PVR), a television, or any other sort of device or devices. In one implementation, the computing device(s) 202 represents a plurality of computing devices working in communication, such as a cloud computing network of nodes. When implemented on multiple computing devices (e.g., in a cloud computing system, etc.), the computing device(s) 202 may distribute the modules and data among the multiple devices. In some implementations, the computing device(s) 202 represents one or more virtual machines implemented on one or more computing devices.

In some implementations, the network 100 may connect multiple devices represented by the computing device(s) 202, as mentioned above. Also, such network 100 may connect the computing device(s) 202 to other devices. The network 100 may be any type or combination of network, such as a data center network, a wide area network (WAN), a local area network (LAN), or the Internet. Also, the network 100 may be public, private, or include both public and private networks. Further, the network 100 may be wired, wireless, or include both wired and wireless networks. The network 100 may utilize any one or more protocols for communication, such as the Internet Protocol (IP), other packet based protocols, carrier sense multiple access with collision avoidance (CSMA/CA), or any other protocols. Additionally, the network 100 may include any number of intermediary devices, such as routers, switches, base stations, access points, firewalls, or gateway devices. Any of these devices or other devices with similar functions may be used as the intermediate nodes.

In various embodiments, processor(s) 204 may include any one or more processors, central processing units, graphic processing units, or any other sort of processing unit.

In some embodiments, the output device(s) 206 include any sort of output devices known in the art, such as a display (described below as display 214), speakers, a vibrating mechanism, or a tactile feedback mechanism. Output device(s) 206 also may include ports for one or more peripheral devices, such as headphones, peripheral speakers, or a peripheral display.

In various embodiments, input device(s) 208 include any sort of input devices known in the art. For example, input devices 208 may include a microphone, a camera, a keyboard/keypad, or a touch-sensitive display (such as the touch-sensitive display screen described above). A microphone may accept voice commands as input. A camera may capture an image or gesture as input. A keyboard/keypad may be a multi-key keyboard (such as a conventional QWERTY keyboard) or one or more other types of keys or buttons, and may also include a joystick-like controller and/or designated navigation buttons, or the like.

In various embodiments, the network interface(s) 210 may be any sort of interfaces. The network interface(s) 210 may support both wired and wireless connections to networks, such as cellular networks, radio, Wi-Fi networks, and short range networks (e.g., Bluetooth, IR, and so forth). Network interfaces 210 may include any one or more of a WAN interface or a LAN interface.

In some embodiments, the transceiver(s) 212 include any sort of transceivers known in the art. The transceiver(s) 212 may include a radio interface. The transceiver(s) 212 may facilitate wired or wireless connectivity between the computing device(s) 202 and other devices.

In various embodiments, the display(s) 214 may be a liquid crystal display or a cathode ray tube (CRT) display. Display(s) 214 may also be a touch-sensitive display screen, and can then also act as an input device or keypad, such as for providing a soft-key keyboard, navigation buttons, or the like.

The machine readable media 222 may be located in drive unit(s) 220 to store one or more sets of instructions (e.g., software) embodying any one or more of the methodologies or functions described herein. The instructions may also reside, completely or at least partially, within the memory 230 and within the processor(s) 204 during execution thereof by the computing device(s) 202. The memory 230 and the processor(s) 204 also may constitute the machine readable media 222.

Depending on the exact configuration and type of the computing device(s) 202, the memory 230 may be volatile (such as RAM), non-volatile (such as ROM, flash memory, miniature hard drive, memory card, or the like) or some combination thereof. The memory 230 may include an operating system, one or more program modules, and program data.

The computing device(s) 202 may have additional features and/or functionality. For example, the computing device(s) 202 may also include additional data storage devices (removable and/or non-removable) such as, for example, magnetic disks, optical disks, or tape. Such additional storage may include removable storage and/or non-removable storage. Machine readable media 222 may include, at least, two types of Machine readable media, namely computer storage media and communication media. Computer storage media may include volatile and non-volatile, removable, and non-removable media implemented in any method or technology for storage of information, such as computer readable instructions, data structures, program modules, or other data. The system memory 114, the removable storage and the non-removable storage are all examples of computer storage media. Computer storage media includes, but is not limited to, RAM, ROM, EEPROM, flash memory or other memory technology, CD-ROM, digital versatile disks (DVD), or other optical storage, magnetic cassettes, magnetic tape, magnetic disk storage or other magnetic storage devices, or any other non-transmission medium that can be used to store the desired information and which can be accessed by the computing device(s) 202. Any such computer storage media may be part of the computing device(s) 202. Moreover, the machine readable media 222 may include computer-executable instructions that, when executed by the processor(s) 204, perform various functions and/or operations described herein.

In contrast, communication media may embody computer-readable instructions, data structures, program modules, or other data in a modulated data signal, such as a carrier wave, or other transmission mechanism. As defined herein, computer storage media does not include communication media.

In various embodiments, memory 230 (and other memories described throughout) is an example of computer-readable storage media and may include the volatile and nonvolatile memory. Thus, the memory 230 may include, but is not limited to, RAM, ROM, EEPROM, flash memory, or other memory technology, miniature hard drive, memory card, optical storage (e.g., CD, DVD), magnetic cassettes, magnetic tape, magnetic disk storage (e.g., floppy disk, hard drives, etc.) or other magnetic storage devices, or any other medium which can be used to store media items or applications and data which can be accessed by the computing device(s) 202. Memory 230 may also be described as computer readable storage media and may include removable and non-removable media implemented in any method or technology for storage of information, such as computer readable instructions, data structures, program modules, or other data.

The memory 230 may be used to store any number of functional components that are executable on the processor(s) 204, as well as data and content items that are rendered by the computing device 202. Thus, the memory 230 may, for example, store an operating system. In various embodiments, the congestion detection module 232, congestion notification module 234, de-queue marking module 236 and FIPS module 238 may be stored in the memory 230. This computing device 202 may be implemented in existing ECN-capable switches, without performing any end-system modifications.

The congestion detection module 232 determines if there may be congestion in the network 100. In some embodiments, instant or current queue length represents possible congestion of all TCP connections sharing the same bottleneck. If the focus is to deal with temporal congestion caused by traffic burstness, e.g., incast congestion, a congestion control scheme may use instant or current queue length information directly.

The congestion detection module 232 compares the instant or current queue length value with a pre-configured threshold value at the intermediate node 120 whenever packets are processed. If the instant or current queue length is greater than or equal to the threshold value, the packets are marked with a bit at the packet header to indicate possible congestion in the network 100. In some embodiments, the ECN parameters may be used to tune the behavior of this scheme. First, ECN switches allow a weight parameter to adjust the exponential factor for updating averaged queue length. By setting this factor to 1, the averaged queue length is effectively the same as the instant queue length because the values in the history are ignored. Second, ECN switches accept two threshold parameters, the low and high threshold parameters. By setting the two threshold parameters to the same value, they become one single threshold value and the region in between the low and high thresholds is no longer in effect.

The congestion detection module 232 determines the single threshold value. The congestion detection module 232 obtains the lower bound for the threshold value at which the TCP throughput performance will not be affected after congestion window reduction at the source node 110 by ECN. The threshold value h that will not affect TCP throughput is obtained as the BDP, such that:

$$h \geq T \times C \quad (1)$$

where T is the averaged Round Trip Time (RTT) for TCP connections in the network, and C is the bottleneck link capacity.

In the case of multiple TCP connections on the same bottleneck link, the threshold h may be similarly obtained according to: $h \geq T \times C / \sqrt{N}$, where N is the number of long TCP flows on the bottleneck link. For shallow-buffered Top of Rack (ToR) switches that connect servers, synchronization of a small number of TCP connections still takes effect so that the lower bound remains close to the BDP.

The congestion detection module 232 determines the upper bound for the threshold value at which the congestion windows at the source node of the TCP connections sharing the bottleneck link are effectively controlled to avoid overflow. In other words, when the threshold value is lower than the upper bound, there is no TCP packet loss.

To obtain the upper bound, the congestion window size at the source node 110 is denoted as $w_e$ when the threshold value is reached at the intermediate node 120. The value of window size $w_e$ is bounded by the threshold h and the BDP. Therefore, the relationship may be represented as:

$$w_e \leq h + T \times C. \quad (2)$$

Note that whether the value of the window size at the source node 110 is properly sized is determined by the value of h and the BDP. To ensure there is no packet loss, the source node buffer size B should be larger than a maximum possible queue length, e.g., $$h + w_e \leq B. \quad (3)$$

From equations 2 and 3, the upper bound for the threshold value to avoid packet loss is:

$$h \leq \tfrac{1}{2}(B - T \times C). \quad (4)$$

As the threshold value h also has a lower bound, defined in equation 1, equation 4 also gives the minimum source node buffer size to avoid buffer overflow as:

$$B \geq 2h + T \times C \geq 3T \times C. \quad (5)$$

This condition holds for multiple synchronized TCP connections as long as the total congestion window at the source node 110 of those connections may be successfully reduced.

Referring back to FIG. 2, in various embodiments, a congestion notification module 234 may be configured to mark packets. As stated above, if the instant queue length is greater than or equal to the threshold, the packet may be marked by asserting a bit at the packet header such as the congestion experienced (CE) bit.

In some embodiments, the congestion notification module 234 may include the de-queue marking module 236. In other embodiments, the de-queue marking module 236 may be a separate module from the congestion notification module 234. In other embodiments, the de-queue marking module 236 does not modify the TCP stack at the end server.

In various embodiments, the de-queue marking module 236 attempts to trigger the threshold faster by marking the packets that are leaving the output queue instead of marking the packets arriving at the output queue. When marking a packet as the packet arrives, such congestion information (e.g., marked CE bit on packet just queued) ends up waiting in the queue until the marked packet moves to the head of the queue. If the threshold value is set to a large value to accommodate TCP throughput of long flows, marking packets when packets are queued delays the delivery of congestion information.

In some embodiments, the threshold value is not set dynamically according to the traffic categories because such a solution may be hard to implement due to the traffic dynamics in the data center networks. In other embodiments, the threshold may be set using the network statistics based at least in part on the traffic dynamics. The threshold value may be set with any strategy as desired.

In various embodiments, de-queue marking may be used for instant queue length based ECN at switches. When an ECN capable packet is going to be de-queued, the de-queue marking module checks the instant queue length and the ECN threshold. If the instant queue length is larger or equal to the ECN threshold, then the packet is marked with the CE bit. There are benefits that may be obtained from de-queue marking. For example, the latency to deliver the congestion information may be reduced.

De-queue marking module 236 determines whether packets may be marked when the packets are about to be transmitted, which is different from a mark-from-front process of the standard ECN protocol.

In various embodiments, a Flexible Initial Packet Size (FIPS) module 238 may be configured to deduce a threshold from the congestion window to maintain throughput. The threshold is determined in terms of the number of packets in the output queue on a particular switch port.

In some embodiments, the FIPS module 238 attempts to trigger a given ECN threshold faster than the standard ECN process. The FIPS module 238 generates packets with payloads having smaller transmission units than the standard size payloads having maximum transmission units. Correspondingly, the instant queue length in terms of number of packets becomes larger so that the ECN threshold is triggered earlier because more smaller packets are queued than if fewer packets having a larger size are queued. Another benefit is that the queuing latency with small packets is correspondingly much smaller, so that the latency before the senders cut their congestion windows also becomes smaller. In some embodiments, the FIPS module only uses small packets during the initial rounds of a TCP connection, so performance of long flows may not be affected.

In various embodiments, the FIPS module 238 may determine the size of the small packets, or the number of the small packets generated per original maximum transmit unit (MTU). Furthermore, the FIPS module 238 may determine a maximal total number of the small packets. As small packets introduce extra overhead, the total number of small packets generated may be well controlled. Moreover, the FIPS module 238 may determine the condition where small packets may be used, and also the condition where the original link MTU may be used.

The number of the small packets per link MTU is determined by at least two factors: 1) the gain of lowering the effective threshold obtained by early triggering; and 2) header overhead introduced by a larger number of small packets as compared to a smaller number of large packets. For example, n=4 may be chosen for Gigabit Ethernet. For a future anticipated 10 GbE network, a 9000 byte jumbo frame is a normal link MTU. In this case, n=6 may be used.

The maximal total number of the small packets may be determined by at least two factors: 1) end system overhead increases when processing a large number of small packets, and thus throughput performance may be degraded; and 2) switches' capability to handle small packets.

In some embodiments, small packets are used only on the initial two round trip times (RTTs). This is because using small packets for only one RTT may face some corner cases in which the threshold is not triggered, and the small packets also introduce extra system overhead. Any amount of small packets may be used depending on the network. In other embodiments, a TCP connection with idle timeout (no data from the application) will resume with a restart congestion window, so in this case small packets may also be used.

In some embodiments, small packets may not be used. First, if the data volume from an application is less than the maximal volume that could be transmitted in the first two RTTs, the small packets may not be used. In an example implementation, the FIPS module 238 is designed to detect potential congestion in the network, and to guide congestion control for later transmissions on this connection. Therefore, such small packets "probing" may be unnecessary for a connection with data volume that can be finished in two RTTs. Second, if ACK packets with an ECE (Echoing Congestion Experience) bit on are received before two RTTs duration ends, then small packet transmission may be stopped and normal MTU may be resumed. This is because TCP has entered congestion avoidance and obtains a reasonable congestion window, so small packets may not be helpful anymore.

In various embodiments, the FIPS scheme may be represented by pseudocode as shown below.

```
Init:/*A new connection or it resumes after idle timeout*/
1   FIPS=false; n = 4 for GbE and n = 6 for 10GbE; c=0;
2   if (app_data≥ 3 * cwnd_ini) {FIPS=true;}
sending data:/*send as much as congestion window permits*/
3   if (FIPS){
4      send a small packet using size mtu/n;
5      c = c+mtu/n;/*count small packets sent*/
6      if (c ≥ 3 * cwnd_ini) {FIPS=false;}
7   }else
8      {send packets using mtu;}
receiving ACK or retransmission timeout:
9   if (ECE(ACK) or Timeout) {FIPS=false;}
```

The pseudocode describes the usage of small packets, where n is chosen based on the bandwidth of the network, $cwnd_{ini}$ denotes the initial congestion window size in bytes, and mtu denotes the number of bytes of the payload in MTU.

According to the pseudocode, small packets are transmitted during the first two RTTs. In some embodiments, the TCP congestion window may grow to $2*cwnd_{ini}$ at the end of a first RTT. Thus, the TCP may transmit at most $3*cwnd_{ini}$ in the first two RTTs. Therefore, the FIPS module configures the network to use small packets until the transmitted data is over $3*cwnd_{ini}$.

Example Processes

Figure 3:
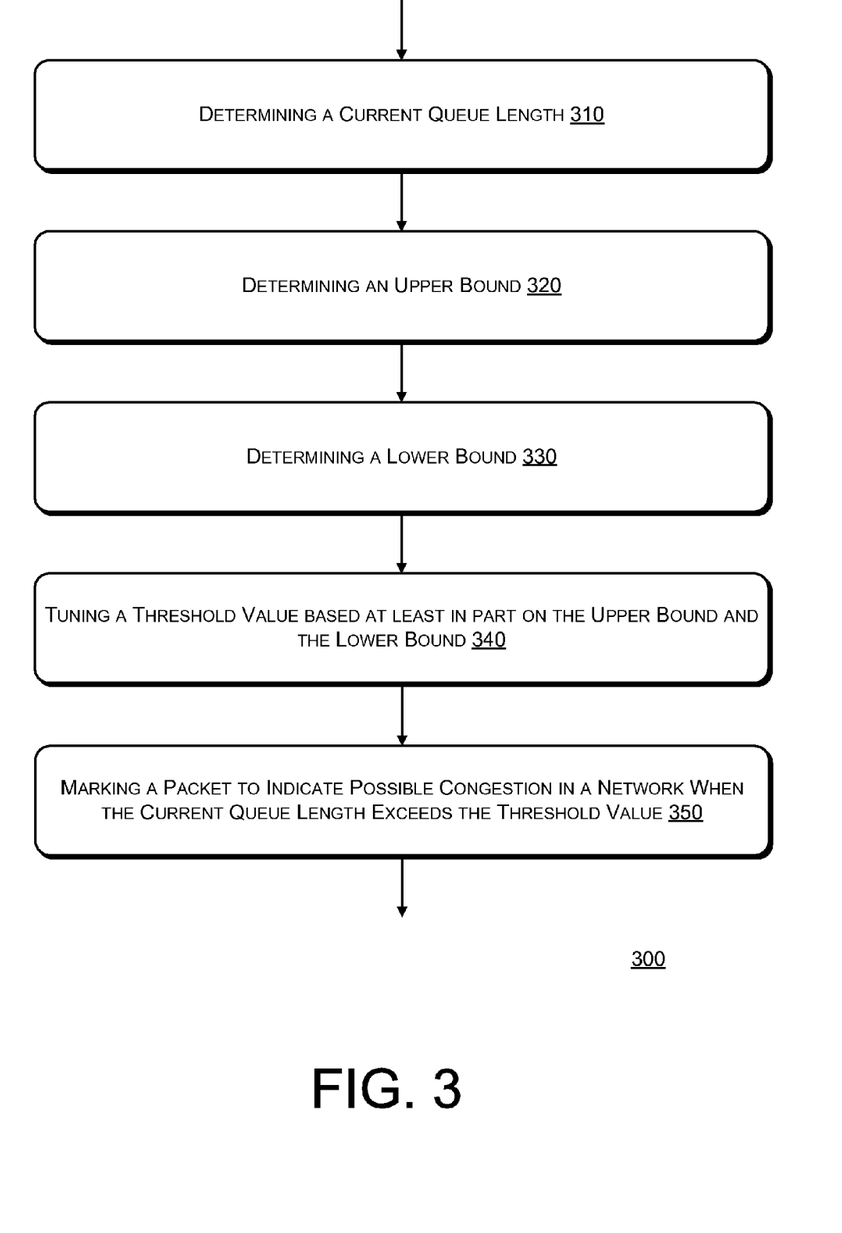
FIG. 3 illustrates an example process for congestion notification, in accordance with various embodiments.

FIG. 3 is a flow diagram of an illustrative process 300 for congestion notification. The process 300 is illustrated as a collection of blocks in a logical flow graph, which represents a sequence of operations that may be implemented in hardware, processor-executable instructions (software or firmware), or a combination thereof. In the context of software, the blocks represent computer-executable instructions that, when executed by one or more processor(s) 204, cause the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Further, these operations may, but need not necessarily, be implemented using the arrangement of FIGS. 1-2. Consequently, by way of explanation, and not limitation, the method is described in the context of FIGS. 1-2. Other processes described throughout this disclosure, including the processes 400, and 500, in addition to process 300, shall be interpreted accordingly.

In various embodiments, the process 300 for congestion notification includes performing, by an intermediate node 120, congestion notification for various embodiments of the TCP protocol. At 310, the intermediate node 120 may determine the current queue length at the intermediate output queue 160.

At 320, the intermediate node 120 may determine an upper bound. The upper bound is determined to be the threshold at which the congestion windows of the TCP connection sharing a bottleneck link are effectively controlled to avoid buffer overflow at the source node 110. In other words, when the threshold is lower than the upper bound, there is no packet loss.

At 330, the intermediate node 120 may determine a lower bound. The lower bound for the threshold is the minimum queue size at which the throughput performance will not be affected after congestion window reduction. In some embodiments, the queue size of the nodes should be large enough so that no packet is dropped due to overflow.

At 340, the intermediate node 120 may tune a threshold value based at least in part on the upper bound and the lower bound. In various embodiments, the threshold value is set to be smaller than the upper bound and larger than the lower bound as determined in 320 and 330.

At 350, the intermediate node 120 may mark a packet to indicate possible congestion in the network. In some embodiments, possible congestion in the network may be indicated when the current queue length exceeds the threshold value. Other situations may also indicate possible congestion in the network. Any indicators may be used. In some embodiments, the packet arriving is marked. In other embodiments, the packet leaving the intermediate output queue is marked.

Figure 4:
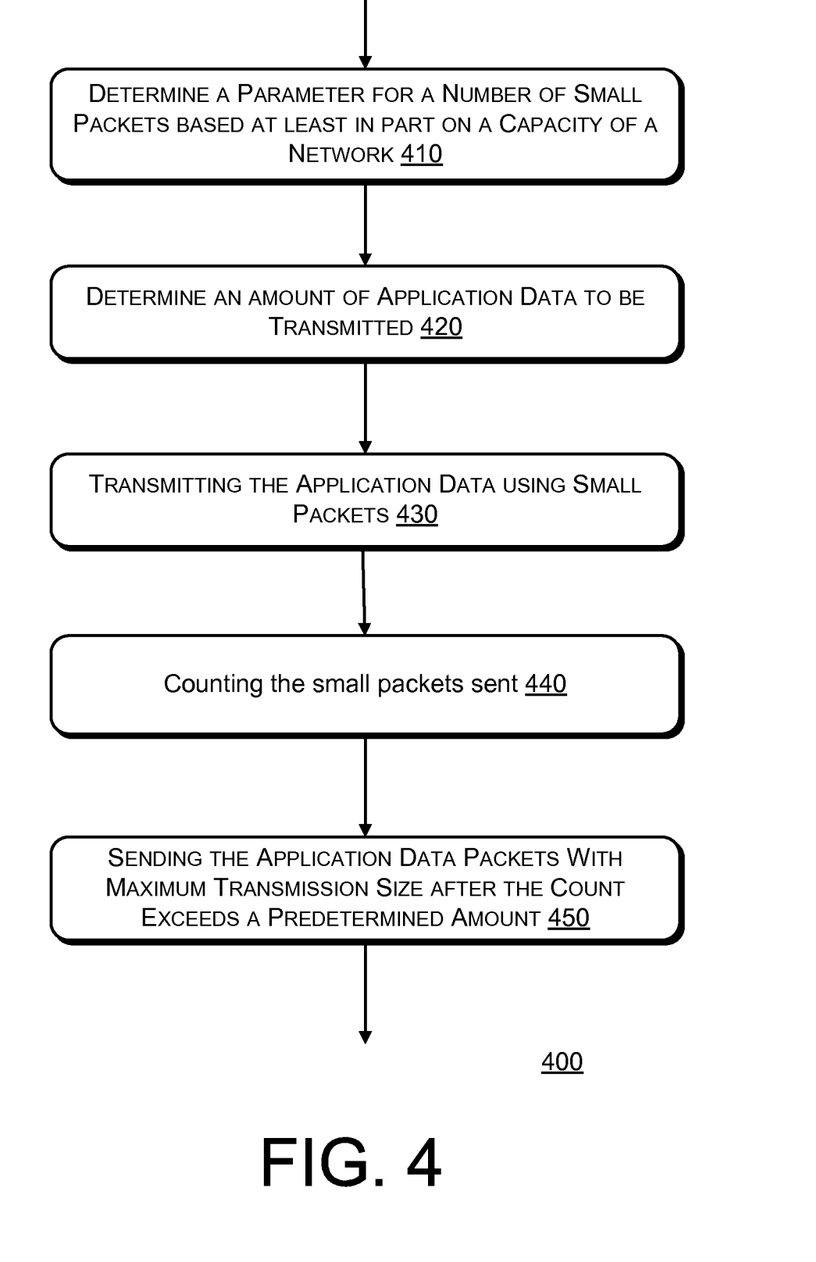
FIG. 4 illustrates an example process for implementing FIPS, in accordance with various embodiments.

In various embodiments, the process for implementing FIPS 400 includes performing, by the computing device(s) 202 at the source node 110, which is sending one or more packets, FIPS operations for various embodiments. FIPS operations may be used when data transmission for an application is over a new connection or is being resumed after an idle timeout.

At 410, the source node 110 may determine a parameter for a number of small packets. In some embodiments, the number is based at least in part on a capacity of the network. In other embodiments, the number may indicate how many small packets are to be formed from a regular sized packet with MTU. For example, the number may be 4 for 1 GbE and 6 for 10 GbE.

At 420, the source node 110 may determine the amount of data to be transmitted in association with an application. In some embodiments, FIPS are used only if the amount of data is greater than or equal to 3 times the size of the initial congestion window. In other embodiments, FIPS may be utilized when desired to calibrate the threshold at the intermediate node 120.

At 430, the source node 110 may transmit the application data using the small packets. In some embodiments, the small packet has the size MTU/n where MTU is the packet size of a regular sized packet and n is the parameter determined in 410.

At 440, a count is maintained to determine whether enough small packets have been sent to configure the threshold at the intermediate node 120. In various embodiments, the count may be incremented every time a small packet is sent. In some embodiments, if the count is below a predetermined value, then the application data transmitted may continue to be in small packets. In other embodiments, if the count is above or equal to the predetermined value, then packets having MTU may be sent as described in 450.

At 450, the source node 110 may transmit application data packets with MTU in the network when the count exceeds a predetermined value. In some embodiments, after the count becomes greater than or equal to 3 times the size of the initial congestion window, the source node 110 may start transmitting regular sized packets.

In various embodiments, regular sized packets may be used after a congestion indicator or a timeout is received even if the count is below the predetermined value.

Figure 5:
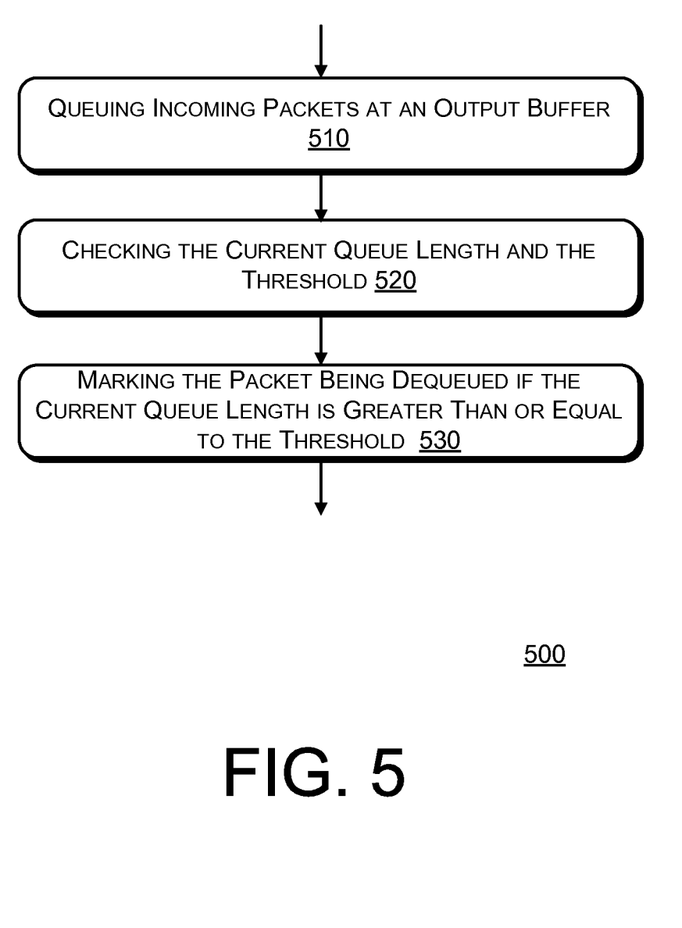
FIG. 5 illustrates an example process for de-queue marking, in accordance with various embodiments.

FIG. 5 illustrates an example process for de-queue marking 500, in accordance with various embodiments. This process may be performed at the intermediate node 120 without modification to the end nodes.

At 510, incoming packets are queued at the output queue 160 for an output port at the intermediate node 120. In some embodiments, the incoming packets are small packets as described in FIG. 4. In other embodiments, the packets have a regular packet size with MTU.

At 520, when a packet is going to be de-queued, the intermediate node 120 may check the current queue length and the threshold. In other embodiments, the average queue length may be checked. In some embodiments, the threshold may be determined with an upper bound and lower bound as described in FIG. 3. In other embodiments, the upper threshold value is used when the upper and lower threshold values are different numbers.

At 506, packet being de-queued is marked if the queue length is greater than or equal to the threshold. In some embodiments, the CE bit of the packet is asserted when the packet is being de-queued. Any method to indicate possible congestion may be used such as providing the indication in the header of the packet.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more processors;
a memory coupled to the one or more processors to store:
a congestion detection module configured to:
determine a current queue length at an intermediate node of one or more data center networks;
a threshold module configured to:
set a threshold value for the current queue length by determining an upper bound and a lower bound;
a congestion notification module configured to mark a packet comprising application data, the packet having a predetermined size with a maximum transmit unit (MTU) to indicate possible congestion in the one or more data center networks when the current queue length exceeds the threshold value, wherein the congestion notification module comprises a de-queue marking module configured to mark the packet when the packet is being de-queued, wherein the packet is de-queued prior to transmission of the packet; and
a flexible initial packet size (FIPS) module configured to probe the network with a plurality of small packets comprising the application data, the plurality of small packets having a smaller payload size than the packet having the predetermined size.

2. The system of claim 1, wherein the threshold value is larger than the lower bound and smaller than the upper bound.

3. The system of claim 2, wherein the upper bound for the threshold value is determined such that no packet is dropped due to buffer overflow.

4. The system of claim 2, wherein the lower bound is determined such that throughput performance is not affected after a congestion window at a source node is reduced.

5. The system of claim 1, wherein the packet is marked by setting a bit in a header of the packet to indicate congestion.

6. The system of claim 1, wherein the packet is marked when the current queue length is greater than or equal to the threshold value.

7. The system of claim 1, wherein a congestion window size is bounded by the threshold value and a bandwidth delay product.

8. The system of claim 1, wherein congestion control is used at end hosts of the one or more data center networks without modification of an explicit congestion control (ECN) protocol.

9. The system of claim 1, wherein the congestion notification module marks the small packets to indicate possible congestion in the one or more data center networks based at least in part on the current queue length and the threshold value.

10. The system of claim 1, wherein the threshold value is set based at least in part on the small packets.

11. A computer-implemented method comprising:
determining a parameter for a number of small packets based at least in part on a capacity of a network;
adjusting a threshold value at an intermediate node based at least in part on the small packets, wherein the intermediate node uses de-queue marking performed prior to transmission of the packet;
determining an amount of application data to be transmitted;
transmitting the application data using the small packets based at least in part on the number and the amount;
determining a size of the small packets having a smaller payload size than application data packets, the application data packets being a predetermined size with a maximum transmit unit (MTU), wherein the intermediate node marks the small packets to indicate possible congestion in one or more data center networks based at least in part on a current queue length and a threshold value at the intermediate node;
providing a count of sent small packets; and
sending the application data packets with maximum transmission size after the count of sent small packets reaches a predetermined value or after a congestion indicator or a timeout is received.

12. The method of claim 11, wherein determining the size of the small packets is based at least in part on an initial congestion window.

13. A computer-implemented method comprising:
determining a current queue length at an intermediate node of one or more data center networks;
setting a threshold value for the current queue length based at least in part on an upper bound and a lower bound;
when a packet, comprising application data and having a predetermined size with a maximum transmit unit (MTU), is being de-queued at the intermediate node prior to transmission of the packet, marking the packet to indicate possible congestion in the one or more data center networks based at least in part on the current queue length and the threshold value; and
probing the one or more data center networks with a plurality of small packets comprising the application data and having a smaller payload size than the packet.

14. The computer-implemented method of claim 13, wherein probing the one or more data center networks comprises:
determining a number of the small packets to transmit based at least in part on a capacity of the one or more data center networks;
determining an amount of data packets to be transmitted;
transmitting the data using the small packets based at least in part on the amount;
performing a count of sent small packet; and
sending the data packets with maximum transmission size after the count exceeds a predetermined value or after a congestion indicator or a timeout is received.

15. The computer-implemented method of claim 13, wherein setting the threshold value is further based at least in part on the small packets.

16. The computer-implemented method of claim 13, wherein the packet being de-queued is marked when the current queue length is larger than or equal to the threshold value.

17. The computer-implemented method of claim 13, wherein the upper bound for the threshold value is determined such that no packet is dropped due to buffer overflow, and the lower bound is determined such that throughput performance is not affected after a congestion window at a source node is reduced.

* * * * *